US008374145B2

(12) United States Patent  
Yoon et al.

(10) Patent No.: US 8,374,145 B2  
(45) Date of Patent: *Feb. 12, 2013

(54) METHOD FOR REQUESTING AND REPORTING CHANNEL QUALITY INFORMATION IN WIRELESS PORTABLE INTERNET SYSTEM

(75) Inventors: Chul-Sik Yoon, Daejeon (KR); Jae-Heung Kim, Daejeon (KR); Kun-Min Yeo, Daejeon (KR); Soon-Yong Lim, Daejeon (KR); Byung-Han Ryu, Daejeon (KR)

(73) Assignees: Electronics and Telecommunications Research Institute (KR); Samsung Electronics Co., Ltd (KR); KT Corporation (KR); SK Telecom Co., Ltd (KR); KT Freetel Co., Ltd (KR); Hanaro Telecom., Inc. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/212,809

(22) Filed: Aug. 18, 2011

(65) Prior Publication Data

US 2011/0305218 A1 Dec. 15, 2011

Related U.S. Application Data

(63) Continuation of application No. 10/588,469, filed on Jun. 14, 2007, now Pat. No. 8,018,911.

(30) Foreign Application Priority Data

Feb. 2, 2004 (KR) .......................... 10-2004-0006575  
Jan. 28, 2005 (KR) .......................... 10-2005-0007898

(51) Int. Cl.  
*H04L 27/00* (2006.01)  
(52) U.S. Cl. ..................................... 370/329; 455/452.2  
(58) Field of Classification Search ............... 455/67.14, 455/452.2; 370/345; 345/89  
See application file for complete search history.

(56) References Cited

U.S. PATENT DOCUMENTS

| 6,445,916 | B1 | 9/2002 | Rahman |
| 2002/0054578 | A1 | 5/2002 | Zhang et al. |
| 2004/0013102 | A1* | 1/2004 | Fong et al. ................... 370/345 |
| 2007/0024559 | A1* | 2/2007 | Ahn et al. ..................... 345/89 |

FOREIGN PATENT DOCUMENTS

| JP | 2001-292098 | 10/2001 |
| JP | 2004-282744 | 10/2004 |

* cited by examiner

*Primary Examiner* — Phuoc Doan  
(74) *Attorney, Agent, or Firm* — The Farrell Law Firm, P.C.

(57) ABSTRACT

A method for requesting and reporting channel quality information (CQI) in a wireless portable Internet system is disclosed. Timing of a channel quality information request by a base station is determined, existence of an automatic repeat request acknowledgment (ARQ_ACK) message of downlink data is determined on requesting the channel quality information from the subscriber station, the automatic repeat request acknowledgment message and the radio resource for the channel quality report to the subscriber station is allocated, the automatic repeat request acknowledgment message and the channel quality report information is received, and a modulating and coding level of downlink data is determined by extracting the channel quality report information form the automatic repeat request acknowledgment message.

13 Claims, 13 Drawing Sheets

METHOD FOR REQUESTING AND REPORTING CHANNEL QUALITY INFORMATION IN WIRELESS PORTABLE INTERNET SYSTEM

PRIORITY

This application is a continuation of U.S. application Ser. No. 10/588,469, filed on Jun. 14, 2007, which is based on PCT/KR2005/000314 filed on Feb. 2, 2005, and claims priority to Korean Patent Appln. No. 10-2004-0006575, filed on Feb. 2, 2004, and to Korean Patent Appln. No. 10-2005-0007898, filed on Jan. 28, 2005, the contents of which are incorporated herein by reference.

TECHNICAL FIELD

The present invention relates to a mobile communication system. More specifically, the present invention relates to a method and apparatus for requesting and reporting channel quality information (CQI) in a wireless portable Internet system.

BACKGROUND ART

The wireless portable Internet is a next generation communication system for further supporting mobility, in addition to a short range data communication system which uses stationary access points (APs) such as the conventional wireless local area network (LAN). Various standards have been proposed for the wireless portable Internet, and the international standardization on the portable Internet is in progress by the IEEE 802.16.

The wireless LAN system such as the conventional IEEE 802.11 provides a data communication system which allows short-range radio communication with reference to stationary access points, which provides no mobility of the subscriber station (SS) but which supports wireless LAN data communication in a local area other than wired LAN data communication.

Meanwhile, a new wireless portable Internet system currently progressed by the IEEE 802.16 working group is designed to support the mobility to the subscriber station and thus provide a seamless data communication service thereto when the subscriber station moves from one cell to another cell.

The mobile communication systems including the above-described wireless portable Internet system have been developed for communication systems which support speech services and high-speed packet data services.

Reported information on the radio channel quality of a link to a subscriber station on the move is very important since the information is used to determine an appropriate adaptive modulation and channel coding (AMC) level for the corresponding link to the subscriber station in the system for supporting high-speed mobility. Since the reported information on the radio channel quality is found to be erroneous, a resource allocated to the link to the subscriber station may be wasted, it is accordingly very important to provide reliable channel quality information (CQI) to a scheduler of the base station.

In order to collect information on the channel quality, the base station selects a predetermined subscriber station for each slot from among a plurality of subscriber stations, transmits packet data thereto, and receives channel quality information on a forward channel from the selected subscriber station to determine transmission parameters such as data rates, channel coding rates, and modulation orders.

In order that the subscriber station reports channel quality information to the base station, when the base station transmits a CQI report message to a plurality of subscriber stations, each subscriber station requests bandwidth for reporting channel quality information. When the bandwidth is allocated, each subscriber station reports a channel quality measurement result to the base station in an additional message format.

FIGS. 1 to 3 show general flowcharts for measuring and reporting channel quality information in a mobile communication system. In FIGS. 1 to 3, the transverse axis stands for the time passage, BS symbolizes the base station, and SS symbolizes the subscriber station.

Referring to FIG. 1, in order to measure the radio channel quality between a base station and a subscriber station, the subscriber station receives a CQI request (REP-REQ) message from the base station and requests a bandwidth for a channel measurement report therefrom (S10 to S13), the base station allocates an uplink resource (UL-MAP) to the subscriber station (S14 and S15), and the subscriber station uses the uplink resource and transmits the channel measurement report (REP-RSP) message to the base station (S16 and S17). The REP-REQ/RSP message is a channel measurement report request/response message from among media access control (MAC) managed messages defined in IEEE 802.16.

However, a delay of a predetermined time occurs because of the request and allocation of the uplink bandwidth until the subscriber station reports the channel measurement information to the base station, since the base station allocates no uplink resource to be used for the channel measurement report in advance when requesting channel quality information from the subscriber station, thereby very probably failing to quickly process the varied channel condition and satisfy the quality of service (QoS) criteria.

FIG. 2 shows a process for the subscriber stations to competitively request a bandwidth from the base station. The respective subscriber stations competitively request a bandwidth for a channel measurement report from the base stations in steps S20 to S23, and when the request has failed, the subscriber stations attempt a competitive bandwidth request again through a backoff process in steps S24 to S27. When the attempt is found to be successful, the base station allocates an uplink resource to the corresponding subscriber station, and the subscriber station transmits a channel measurement report to the base station through the allocated uplink resource in steps S28 to S30. In this case, a delay is generated by the backoff, and the request and allocation of the uplink bandwidth.

FIG. 3 shows a process for a subscriber station to transmit a random code for a bandwidth request to the base station in the general case of requesting and reporting the channel quality information.

When the subscriber station transmits a competitive random code for a bandwidth request to the base station according to the channel quality information provided by the base station in steps S40 to S43, the base station cannot determine from the bandwidth request code whether the subscriber station will transmit bandwidth request information (i.e., an amount of data stored in a transmission buffer of uplink data) or transmit the message for the channel measurement report. Accordingly, the subscriber station may be delayed in transmitting the message for the channel measurement report to the base station even though the subscriber station has successfully transmitted the random code to the base station, and hence, the time delay is inevitable. As shown in FIG. 3, when the base station allocates a resource for a bandwidth request and the subscriber station transmits a bandwidth request message before the subscriber station transmits the channel measurement report to the base station, the base station must allocate the uplink resource in steps S44 to S49, and hence, a time delay is generated and it is difficult to guarantee the QoS because of the undesired delay.

Also, the base station must transmit a CQI request message to each subscriber station that will generate a channel measurement report. Hence, when transmitting the CQI request message to a plurality of subscriber stations in a frame, the base station respectively transmits the same unicast message (e.g., a basic connection identifier (CID) according to the IEEE 802.16 standard) to the subscriber stations, thereby increasing overheads.

However, the method for the base station to request the channel quality information from a plurality of subscriber stations in the cage of one frame may exhaust downlink resources since the base station transmits similar messages to the subscriber stations individually. Further, when the base station transmits the message to the subscriber station by using an inadequate AMC level, in detail, when the base station transmits the CQI request message thereto by using the AMC level determined based on the existing channel status even though the channel has already been degraded, some subscriber stations may fail to receive the CQI request message.

Also, overheads of messages are increased when the respective subscriber stations individually transmit a response message for the channel quality measurement result to the base station.

In addition, the mobile system does not guarantee allocation of uplink resources for transmitting the response message of the channel quality measurement result, and hence, heavy delay may be generated when the subscriber station transmits the response message to the base station. As a result, the subscriber stations may fail to transmit the on-time response message thereto, and the base station may not adaptively process the message following the mobile environment

DISCLOSURE

[Technical Problem]

It is an advantage of the present invention to provide a method for quickly adapting to the most recent channel state and applying the most efficient modulation and channel coding level when transmitting/receiving data to/from a corresponding subscriber station.

It is another advantage of the present invention to provide an efficient method for minimizing an overhead of an uplink resource and increasing reliability of a CQI report for an REP-RSP.

It is another advantage of the present invention to provide a method for efficiently receiving the CQI by quickly adapting to the channel environment when transmitting/receiving of data to/from a corresponding subscriber station.

It is another advantage of the present invention to provide a method for using CQI values to determine period and frequency of channel quality report, efficiently perform downlink adaptive modulation, and allocate an encoding level and a radio resource.

[Technical Solution]

In one aspect of the present invention, a method for requesting channel quality information (CQI) in a wireless portable Internet system comprises: a) a base station determining timing of a channel quality information request; b) requesting an automatic repeat request acknowledgement (ARQ-ACK) message of downlink data upon requesting the CQI from a subscriber station; c) allocating a radio resource for the ARQ-ACK message and the channel quality report to the subscriber station; d) receiving information on the ARQ-ACK message and the channel quality report; and e) determining a modulation and coding level of downlink data by extracting the channel quality report information from the ARQ-ACK.

The method further comprises: a-1) determining whether uplink data to be received by the base station exists, after a); b-1) transmitting a piggyback identifier of uplink data to be used to request the CQI to the subscriber station when the uplink data exists; c-1) allocating a radio resource for reporting the CQI to the subscriber station; d-1) receiving the channel quality report information piggybacked on the uplink data; and e-1) extracting the CQI from the uplink data, and determining a modulation and coding level of downlink data based on the reported CQI.

The method further comprises: a-2) determining whether the ARQ-ACK message exists in a-1), when no uplink data to be received by the base station exists; b-2) transmitting an REP REQ medium access control (MAC) message to the subscriber station when no ARQ-ACK message exists; c-2) allocating the radio resource for reporting the CQI to a dedicated channel; d-2) receiving the REP_REQ MAC message through the dedicated channel; and e-2) determining a modulation and coding level of downlink data based on the reported CQI.

In another aspect of the present invention, a method for reporting channel quality information in a wireless portable Internet system, comprises: a) determining whether transmission of an ARQ-ACK message and a REP-REQ is provided from a base station; b) updating the two values into latest values by measuring the CQI when the transmission is provided; c) acknowledging a radio resource allocated for the ARQ-ACK message and the CQI; and d) transmitting the CQI to a base station while being included in the ARQ-ACK message.

The method further comprises: a-1) determining whether a piggyback identifier for transmitting the CQI is transmitted from the base station; b-1) measuring the CQI and updating the same into the latest values when the piggyback identifier is transmitted; c-1) acknowledging a radio resource allocated for the CQI among the radio resources piggybacked on the uplink data; and d-1) transmitting the CQI piggybacked on the uplink data to the base station.

The method further comprises: a-2) determining whether the REP_REQ MAC message is transmitted from the base station; b-2) measuring the CQI and updating the same into the latest value when the REP_REQ MAC message is transmitted; c-2) acknowledging a radio resource of a dedicated channel allocated for the CQI report; and d-2) transmitting the CQI through the dedicated channel to the base station.

[Advantageous Effects]

CQI information is quickly received without an additional bandwidth request from a subscriber station to determine an AMC level and efficiently transmit downlink data by allocating a CQI channel to the subscriber station by a base station.

In addition, CQI period and frequency are determined based on CQI of the REP-RSP.

BEST MODE

Figure 1:
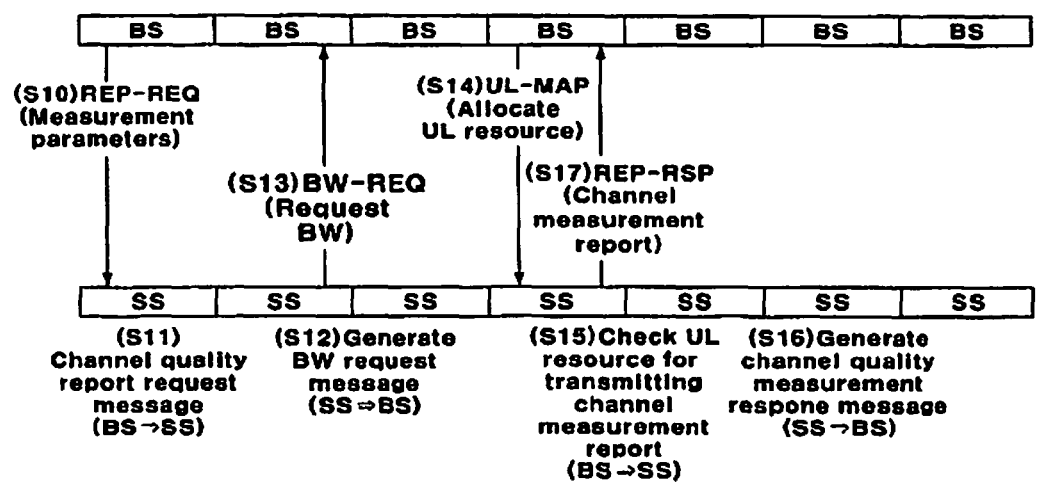
FIGS. 1 to 3 show general flowcharts for requesting and reporting channel quality information.
Figure 2:
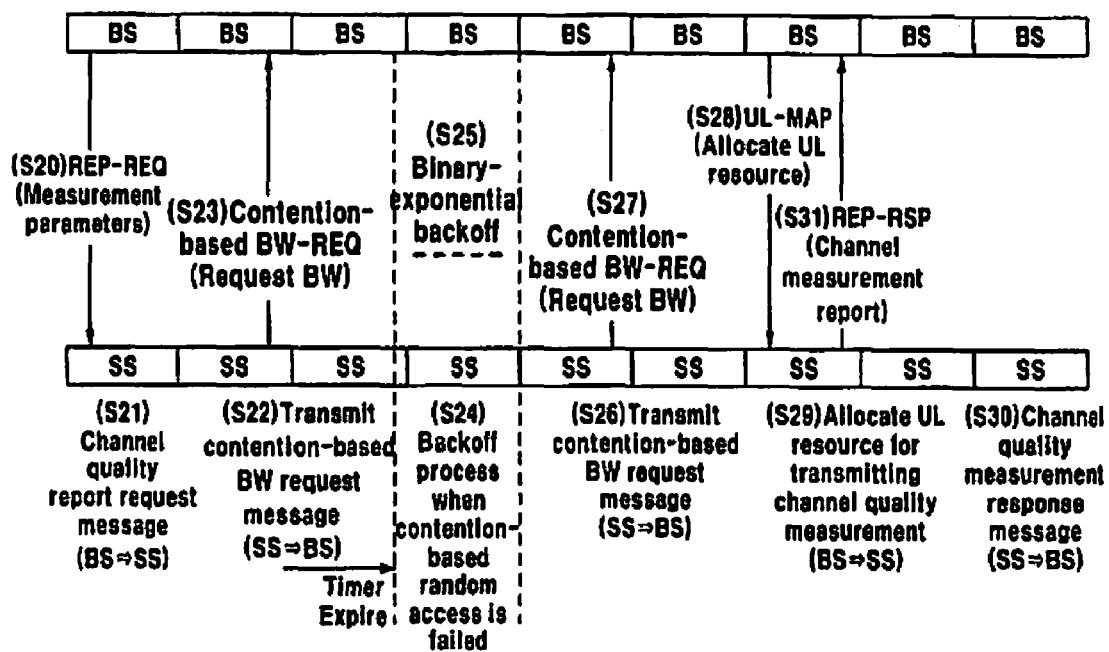
Figure 3:
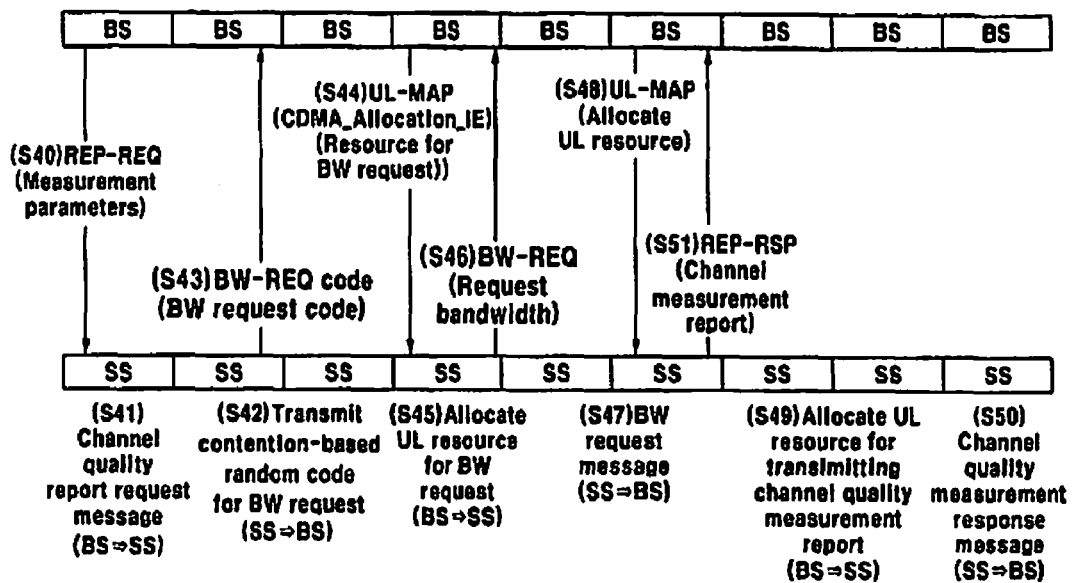

In the following detailed description, only the preferred embodiment of the invention has been shown and described, simply by way of illustration of the best mode contemplated by the inventor(s) of carrying out the invention. As will be known, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

Figure 4:
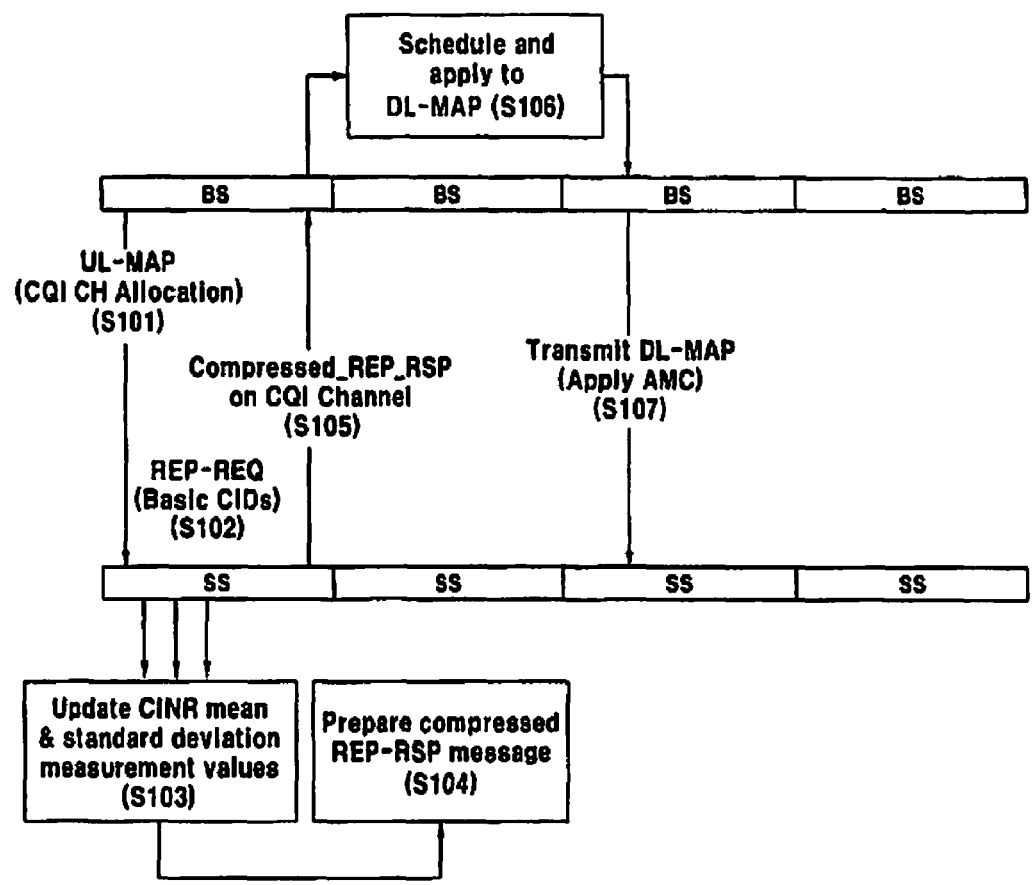
FIG. 4 shows a flowchart for requesting and reporting channel quality information according to one exemplary embodiment of the present invention.

A subsequent method will now be described in order to resolve the above-described problems generated while requesting and reporting the channel quality information in the mobile communication system, FIG. 4 shows a flowchart for requesting and reporting channel quality information according to an exemplary embodiment of the present invention.

As shown in FIG. 4, the base station (BS) allocates a dedicated channel (a CQI channel) for reporting channel quality information (S101). The CQI channel allocation information is included in uplink radio resource allocation information (referred to as a UL-MAP hereinafter), and is transmitted to the subscriber station (SS).

The base station transmits the REP_REQ message through a basic connection identifier to the subscriber station (S102). The subscriber station measures mean value and standard deviation of the downlink carrier to interference noise ratio (CINR), and updates the given mean value and standard deviation (S103).

The updated CINR mean value and standard deviation is compressed and encoded as a REP RSP message or a CQI codeword to be transmitted to the base station (S104).

Then, the subscriber station (SS) transmits the REP-RSP through the allocated CQI channel (S105). As noted above, the REP-RSP message includes the latest mean value and standard deviation of the downlink CINR The base station (BS) receives the REP-RSP messages, performs scheduling based on the CQI, and applies the scheduling to the downlink MAP information (DL-MAP) (S106).

That is, when the channel quality is degraded in the adaptive modulation and channel coding (AMC), the stronger AMC is used so that the DL-MAP is transmitted to the corresponding subscriber station (S107).

Accordingly, the base station allocates the additional CQI channel to the subscriber station so that the AMC level is determined based on the received CQI before the subscriber station requests the additional bandwidth, thereby quickly and efficiently transmitting the DL-MAP.

Also, the period and frequency can be determined based on the CQI included in the REP-RSP.

Figure 5:
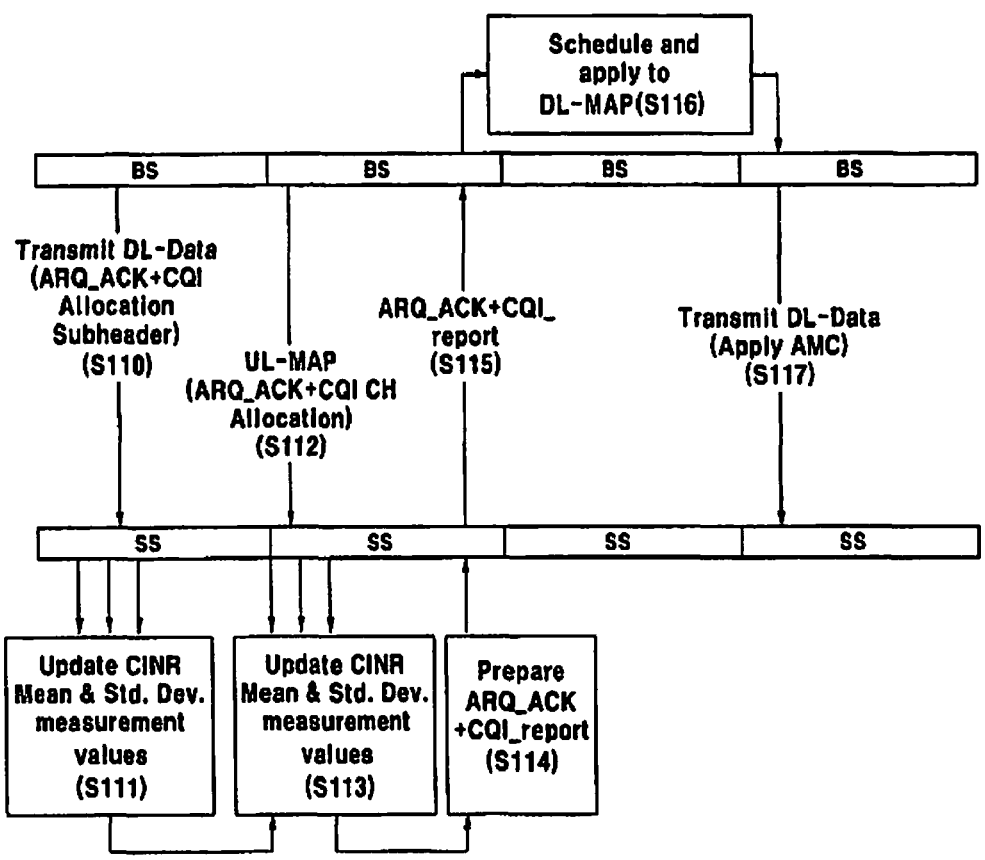
FIG. 5 shows a flowchart for requesting and reporting channel quality information according to another exemplary embodiment of the present invention.

FIG. 5 shows a flowchart for requesting and reporting channel quality information according to another exemplary embodiment of the present invention.

In this embodiment, when the downlink data to be transmitted to the subscriber station exists, the base station requests the CQI report. Also, when the downlink data is transmitted to the subscriber station, the base station acknowledges whether the subscriber station successfully receives the CQI, and applies an automatic repeat request (ARQ) when a repetition is needed.

The base station acknowledges the success of the subscriber station receipt thereof and applies an automatic repeat request (ARQ) algorithm as necessary for retransmitting. According to the ARQ algorithm, the subscriber station transmits the ARQ_ACK message of transmitted downlink data so that the base station is provided with acknowledgement of receiving and retransmitting.

The base station transmits the downlink data to the subscriber station, and simultaneously transmits the ARQ_ACK message and subheader for requesting the CQI report (S110).

The subscriber station receives the subheader, measures the mean value and standard deviation, and updates the existing values (S111).

Meanwhile, the base station allocates the uplink resource for transmitting the ARQ-ACK message and CQI message through the UL-MAP (S112). In order to report the channel quality more exactly, the base station can update the CINR mean value and the standard deviation and generates information for reporting the ARQ_ACK message and channel quality information (S113, S114) when allocating the uplink resource.

The subscriber station transmits the ARQ_ACK message and the channel quality information report message through the allocated uplink resource to the base station (S115).

The base station performs scheduling based on the received channel quality information and applies it to the downlink MAP information (DL-MAP) (S116).

When the channel quality is degraded, the downlink data is transmitted to the corresponding subscriber station by a stronger channel modulating and coding method (S117).

According to this embodiment of the invention, when the base station transmits the downlink data and receives the ARQ_ACK message, the base station simultaneously requests the ARQ_ACK message and channel quality information and receives the channel quality information through the radio resource for the ARQ_ACK message, thereby efficiently reporting the CQI.

Figure 6:
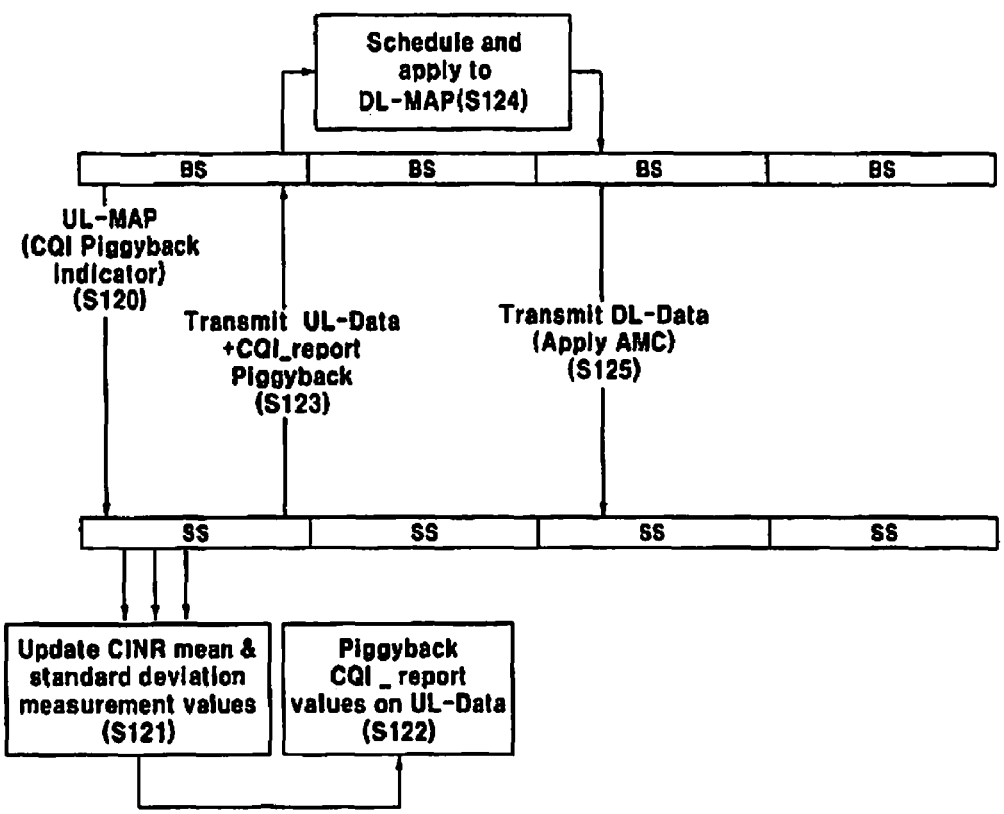
FIG. 6 shows a flowchart for requesting and reporting channel quality information according to another exemplary embodiment of the present invention.

FIG. 6 shows a flowchart for requesting and reporting channel quality information according to another exemplary embodiment of the present invention;

In this embodiment, when the subscriber station has uplink data to be transmitted to the base station, the subscriber station transmits the uplink data while adding the channel quality report information to the protocol data unit (PDU) of the available uplink data Such a transmission method is referred to as piggybacking.

The subscriber station transmits a piggyback identifier for reporting the channel quality information using the UL-MAP (S120).

The subscriber station receives the piggyback identifier, measures the CINR mean values and standard deviation, and updates the same as the latest values (S121). The updated mean value and standard deviation are piggybacked on the uplink data PDU to report the CQI (S122).

The CQI is transmitted when the uplink data is transmitted, and off-set information of the CQI is marked in the UL-MAP (S123).

The base station receives the channel quality information, performs scheduling based on the CQI, and applies the scheduling to the downlink link MAP information (DL-MAP) (S124).

When the channel quality is degraded, the downlink data is transmitted to the corresponding subscriber station by using a stronger channel modulating and coding method (S125).

Accordingly, the subscriber station can report the CQI efficiently using the uplink data PDU without additional channel allocation.

A wireless portable Internet system according to the exemplary embodiment of the present invention will be described in more detail.

Figure 7:
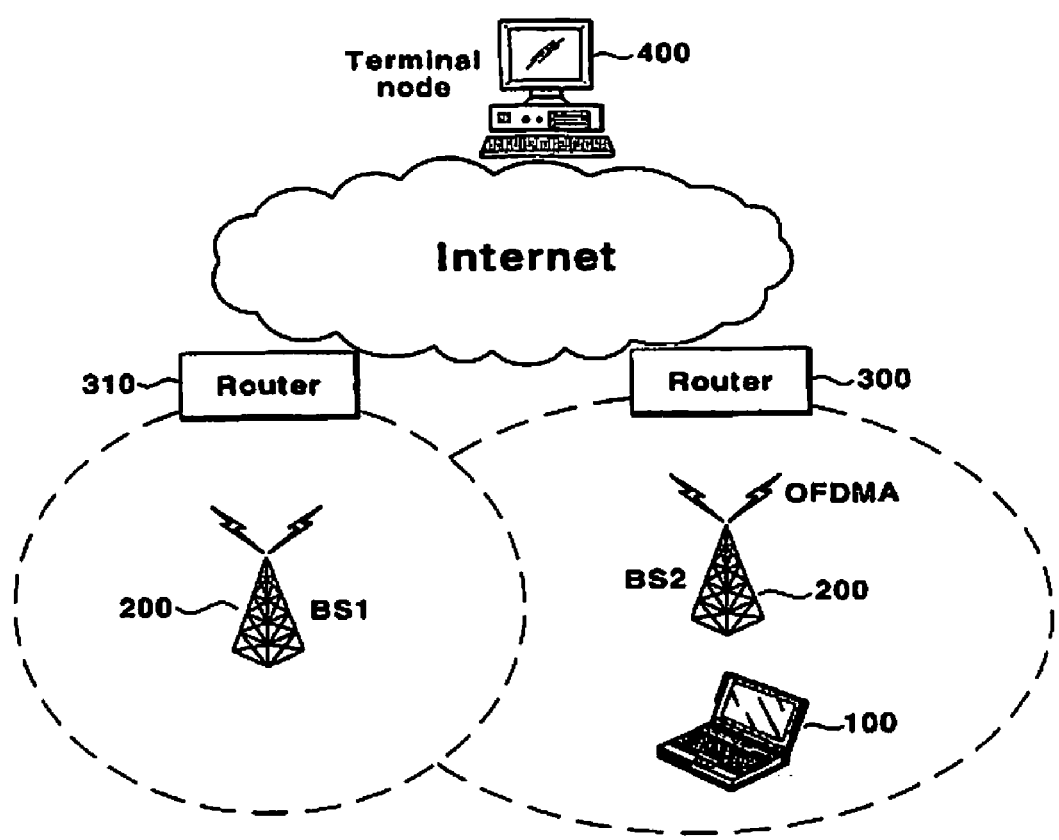
FIG. 7 shows a schematic diagram for a wireless portable Internet system.

FIG. 7 shows a schematic diagram for a wireless portable Internet system according to an exemplary embodiment of the present invention.

The wireless portable Internet system includes a subscriber station 100, base stations 200 and 210 for performing radio communication with the subscriber stations routers 300 and 310 connected to the base station through a gateway, and the Internet.

The wireless portable Internet system guarantees mobility and provides seamless data communication services when the subscriber station 100 shown in FIG. 5 moves from a cell covered by a first base station 200 to another cell covered by a second base station 210, supports a handover function, and allocates dynamic IP addresses as the subscriber station moves.

The wireless portable Internet subscriber station 100 and each of the base stations 200 and 210 communicate with each other through the orthogonal frequency division multiple access (OFDMA) method which is resistant against fading generated by multi-paths and has high data rates, and the exemplary embodiment is not restricted to the OFDMA method.

The IEEE 802.16e standard applies the AMC scheme to select an adaptive modulation and coding scheme by means of request/acceptance between the subscriber station 100 and the base stations 200 and 210.

Figure 8:
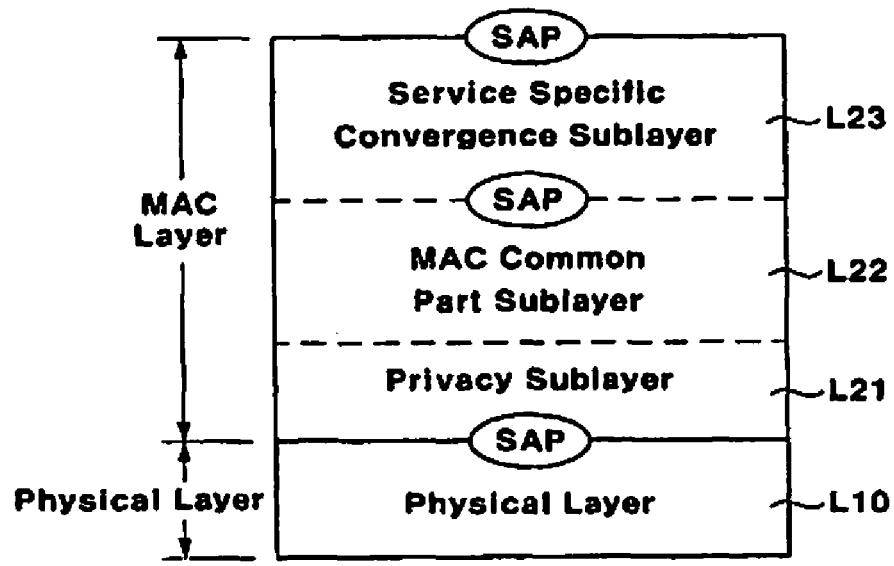
FIG. 8 shows a hierarchical diagram of a wireless portable Internet system.

FIG. 8 shows a hierarchical diagram of a wireless portable Internet system.

The IEEE 820.16e wireless portable Internet system is classified into a physical layer L10, and media access control (MAC) layers L21, L22, and L23. The physical layer L10 performs radio communication functions such as modulation/demodulation, coding/decoding, etc. as performed by a normal physical layer.

Meanwhile, the wireless portable Internet system does not have function-specific MAC layers as a wired Internet system, but rather has a single MAC layer in charge of different functions. The MAC layer includes a privacy sublayer L21, a MAC common part sublayer 122, and a service specific convergence sublayer L23.

The service specific convergence sublayer 123 performs payload header suppression and QoS mapping functions in consecutive data communication.

The MAC common part sublayer 122 is the core of the MAC layer which is in charge of system access, bandwidth allocation, connection establishment and maintenance, and QoS control. The privacy sublayer 121 performs functions of equipment authentication, security key exchange, and encryption. The device authentication is carried on by the privacy sublayer L21, and the user authentication by an upper layer of the MAC (not illustrated).

Figure 9:
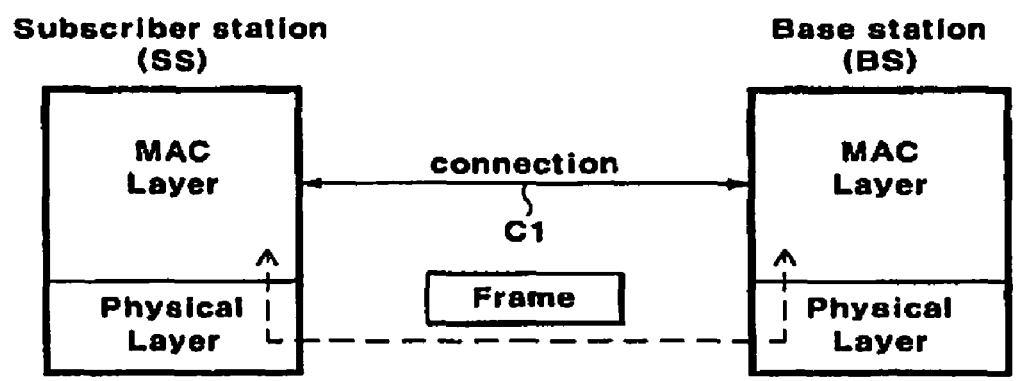
FIG. 9 shows a schematic diagram of a connection structure between a base station and a subscriber station in a wireless portable Internet system.

FIG. 9 shows a schematic diagram of a connection structure between a base station and a subscriber station in the wireless portable Internet system.

A connection is provided between the MAC layers of the subscriber station and the base station. The term "connection C1" as used herein does not refer to a physical connection, but to a logical connection that is defined as a mapping relationship between the MAC peers of the subscriber station and the base station for traffic transmission of one service flow.

Hence, the parameter/message defined on the connection C1 refers to a function executed between the MAC peers. Actually, the parameter/message is processed into a frame, which is transferred through the physical layer and analyzed so as to control the MAC layer to execute the function corresponding to the parameter/message. The MAC message includes various messages for performing request (REQ), response (RSP), and acknowledgment (ACK) for various operations.

Figure 10:
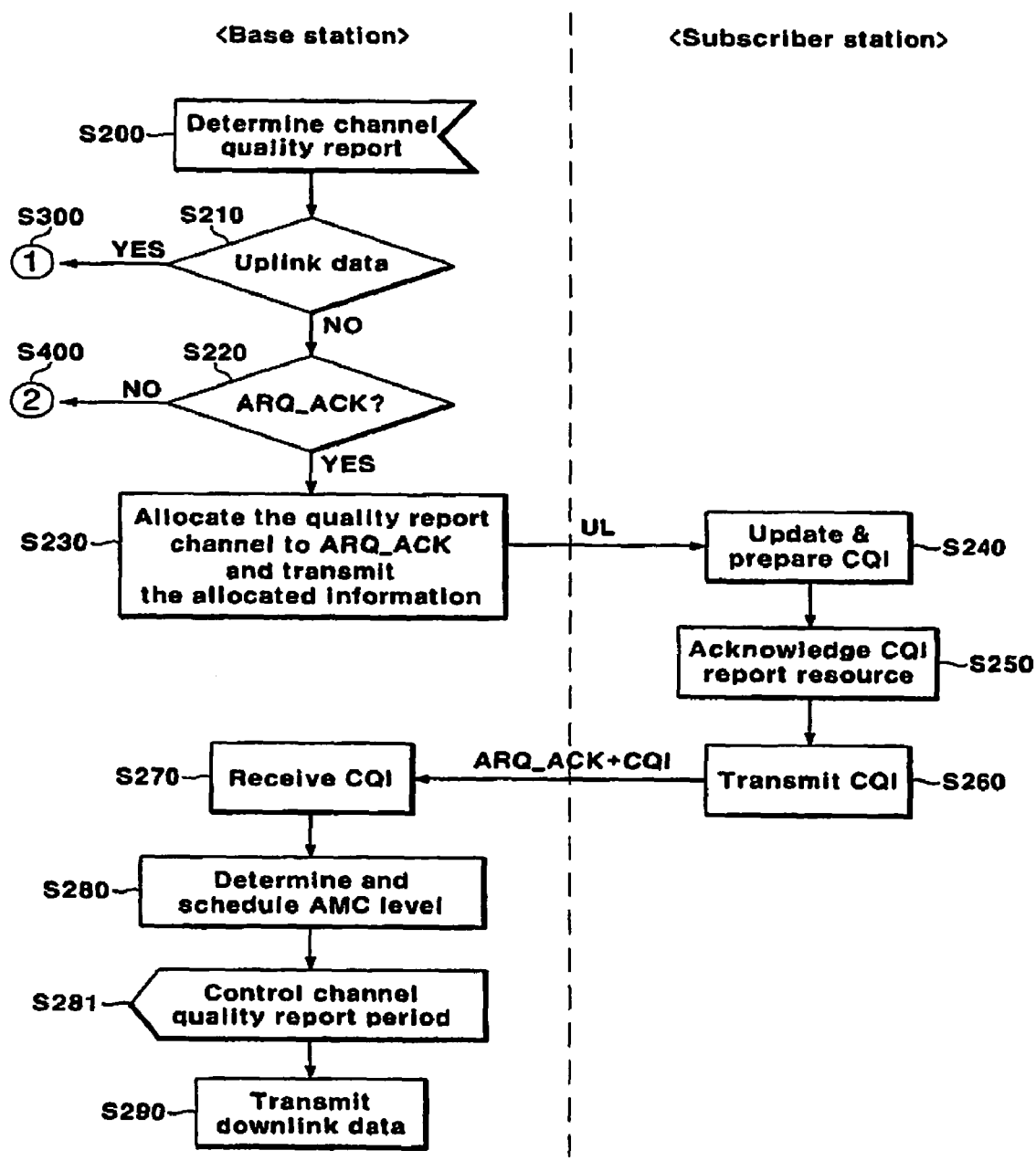
FIG. 10 shows a flowchart for requesting and reporting channel quality information according to an exemplary embodiment of the present invention.

FIG. 10 shows a flowchart for requesting and reporting channel quality information according to an exemplary embodiment of the present invention;

The methods for requesting/reporting the channel quality information as shown in FIGS. 4 through 6 will be selectively determined according to the various conditions between the base station and the subscriber station. For example, when there are no uplink/downlink transmission data and available resources, the CQI may be reported using the REP-REQ and REP-RSP as shown in FIG. 4. Also, when there are uplink transmission data and uplink resource allocation, the CQI may be reported by piggybacking the message on the uplink data PDU. Also, when the subscriber station has no uplink transmission data and has the ACK message including retransmission information of the transmitted downlink data without the uplink transmission data, the channel quality information may be transmitted using the corresponding ARQ_ACK message as shown in FIG. 5.

The base station determines timing to request the channel quality report from the predetermined subscriber station (S200), which is controlled according the mean value and standard deviation of the transmitted CINR.

The base station determines the existence of uplink data to be transmitted from a predetermined subscriber station upon necessity of the channel quality report (S210). When there is no uplink data to be transmitted during the predetermined period, the step 220 (S220) is progressed. Alternatively, when there is uplink data, the step 300 (S300) is progressed.

The method for reporting/requesting the channel quality of the (S300) will be described later in detail.

The base station determines the ARQ_ACK message reception for the transmitted downlink data (S220). When the ARQ_ACK message must be received, the step 230 (S230) is progressed, and when there is no ARQ_ACK message to be transmitted during the predetermined period, the step S400 is progressed.

The method for reporting/requesting the channel quality of the step S400 will be described later in detail.

The base station transmits the channel allocation information for reporting the channel quality information for the ARQ_ACK merge to the subscriber station. The base station can include sub headers of the ARQ_ACK and CQI request messages in the downlink data, and the resource allocation information for ARQ_ACK and CQI request messages in the UL-MAP, and transmit the same.

The subscriber station provided with the channel quality information report request measures the channel quality information, updates the same, and prepares the CQI report (S240). The CQI may be the mean values and standard deviation of the CINR of the measured downlink channel.

The subscriber station acknowledges the radio resource of the ARQ_ACK message used to the CQI report (S250). The radio resource for reporting the CQI are arranged at the predetermined part of the uplink sub-frame according to the UL-MAP information transmitted from the base station.

The subscriber station includes the CQI in the ARQ_ACK message and transmits the same to the base station (S260). The base station extracts the CQI from the transmitted ARQ_ACK message to thus receive the CQI (S270).

The base station receives the CQI including the mean values or standard deviation of the CINR, determines the AMC level, and performs scheduling based on the received CQI (S280). For example, when the channel quality is degraded, the stronger channel modulating and coding may be applied. Also, when the subscriber station is determined for the radio channel environment to be too variable by a large standard deviation of the CINR, the subscriber station may have resources for the CQI report allocated at the front time slot of the uplink resource.

Also, the channel quality report period and frequency of the step 200 may be controlled according to the CQI. For example, when the radio channel environment is determined to have a small variance by a small standard deviation of the CINR, the base station determines the channel environment to be relatively stable so that the base station may control the channel quality report period and frequency to be low. The base station transmits the modulated and coding downlink burst according to the modulating and coding level determined in step 280 to the subscriber station (S290).

Accordingly, when the base station receives the ARQ-ACK message from the subscriber station, the base station may have the CQI report efficiently without allocation of the additional channel or bandwidth.

Figure 11:
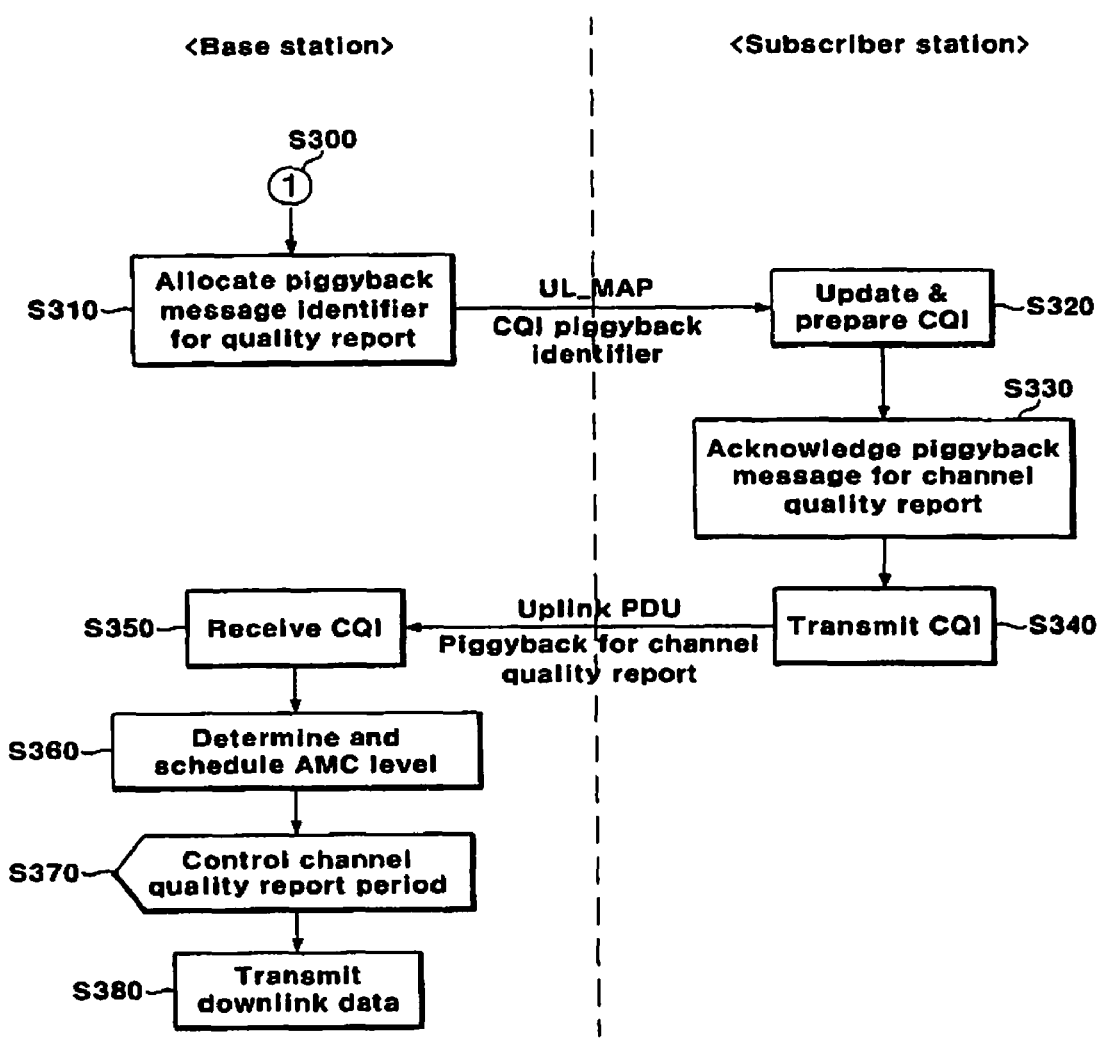
FIG. 11 shows a flowchart for requesting and reporting channel quality information according to an exemplary embodiment of the present invention when the subscriber station has uplink data to be transmitted.

FIG. 11 shows a flowchart for requesting and reporting channel quality information according to an exemplary embodiment of the present invention when the subscriber station has uplink data to be transmitted.

When the subscriber station has uplink data to be transmitted at the step S210 of FIG. 10, the step S300 is progressed.

The following method for reporting/requesting the channel quality of the step S300 will be described in detail.

As above-noted, when the subscriber station has uplink data to be transmitted, the base station allocates the piggyback message identifier for the CQI report to the subscriber station (S310). The piggyback message identifier requests the channel quality report and supplies the PDU identifier piggybacked through the UL MAP to the subscriber station.

When the subscriber station receives the piggyback message identifier, the subscriber station measures the channel quality and updates the same into the latest values (S320). The CQI may be the mean values and/or standard deviation of the CINR of the downlink channel.

When the CQI is updated, the subscriber station uses the piggyback message identifier to acknowledge the piggyback message for the channel quality report and insert the CQI into the uplink data PDU to perform the piggybacking (S330).

The subscriber station includes the CQI in the PDU of the uplink data, and transmits the same to the base station (S340). The base station extracts the CQI from the PDU of the transmitted uplink data to thus receive the CQI (S350).

The base station determines the AMC level and performs scheduling based on the received CQI including the mean values or standard deviation of the CINR (S360). For example, when the channel quality Is degraded, the stronger AMC may be applied. Also, when the radio channel environment is determined to be too variable by the large standard deviation of the CINR, the subscriber station may have resources for the CQI report allocated at the front time slot of the uplink resource.

Also, the channel quality report period and frequency of the step 200 may be controlled according to the CQI (S370). For example, when the standard deviation of the CINR of the downlink reported from the subscriber station is less, the base station determines the channel environment to be relative stable because of less variation of the radio condition so that the base station may control the channel quality report period and frequency to be low. The base station transmits bursts generated by modulating and encoding the downlink data according to the modulating and coding level determined in step S360 to the subscriber station (S380).

Accordingly, according to the exemplary embodiment shown in FIG. 11, when the subscriber station has the uplink data to be transmitted to the base station, the base station requests CQI through a piggyback identifier, and the subscriber station transmits the CQI along with the PDU of the uplink data corresponding to the piggyback identifier, thereby reporting the CQI efficiently.

Figure 12:
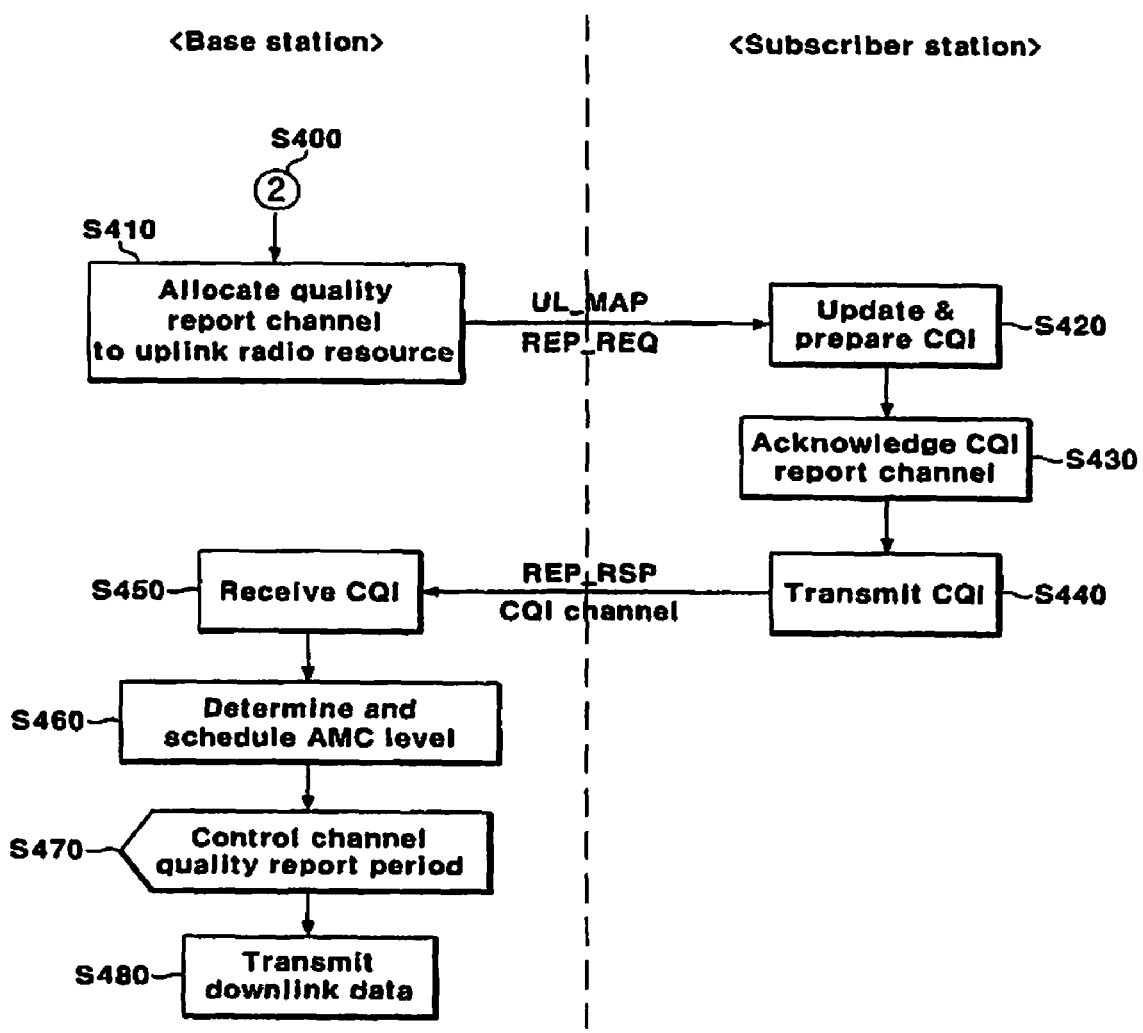
FIG. 12 shows a flowchart for requesting and reporting channel quality information according to an exemplary embodiment of the present invention when the subscriber station has no uplink data to be transmitted.

FIG. 12 shows a flowchart for requesting and reporting channel quality information according to an exemplary embodiment of the present invention when the subscriber station has no uplink data to be transmitted or need not transmit an ARQ_ACK message.

At the step S220, when the subscriber station has no data to transmit to the base station and it is not necessity to have an ARQ_ACK message for the received data, the step S400 is progressed.

The next method for reporting/requesting the channel quality of the step S400 will be described in detail.

Since the base station and the subscriber station has no data or message to transmit/receive therebetween, the base station allocates the channel and requests the CQI report (S410). The CQI request uses the REP-REQ message, which is the MAC managing message, marks the dedicated channel for CQI (a CQI channel), and transmits the same to the UL-MAP. When the subscriber station receives the REP-REQ, the subscriber station measures the CQI and updates the CQI into the latest values (S420). The CQI includes CINR means values or CINR standard deviation of the downlink channel.

When the CQI is prepared to transmit by updating, the subscriber station conforms the CQI channel for reporting the channel quality (S430), and transmits the CQI through the CQI channel to the base station (S440). The subscriber station, of which the basic CID of the REP-REQ message is known, recognizes the detail resource location to use at the CQI channel designated in the UL-MAP according to the sequence of the identifier.

The base station receives the CQI transmitted through the dedicated CQI channel (S450).

The base station receives such CQI as mean values or standard deviation of the CINR, determines AMC level based on the CQI, and performs scheduling (S460). For example, when the channel quality is degraded, the stronger channel modulating level or coding level may be applied. Also, when the subscriber station is determined for the radio channel environment to be too variable by the large standard deviation of the CINR, the subscriber station may have resources for the CQI report allocated at the front time slot of the uplink resource.

Also, the channel quality report period and frequency of the step (S200) can be controlled based on the CQI (S470). In more detail, when the radio channel environment is determined to have a small variance by the small standard deviation of the CINR, the base station determines the channel environment to be relative stable so that the base station may control the channel quality report period and frequency to be low.

The base station transmits the bursts generated by modulating and coding the downlink data according to the modulating and coding level determined in step (S460) to the corresponding subscriber station (S480).

With the embodiment as shown in FIG. 12, reliable channel quality information can be quickly and efficiently reported without delay and the overheads of message transmission can be reduced by the dedicated channel, when the subscriber stations transmit a CQI request message to the base station.

The methods for requesting and reporting the channel quality can be selectively applied according to transmitting/receiving the uplink/downlink data shown in FIGS. 10 to 12. Therefore, the reliable channel quality information can be quickly and efficiently reported by appropriately selecting the one from the above-described three embodiments.

Figure 13:
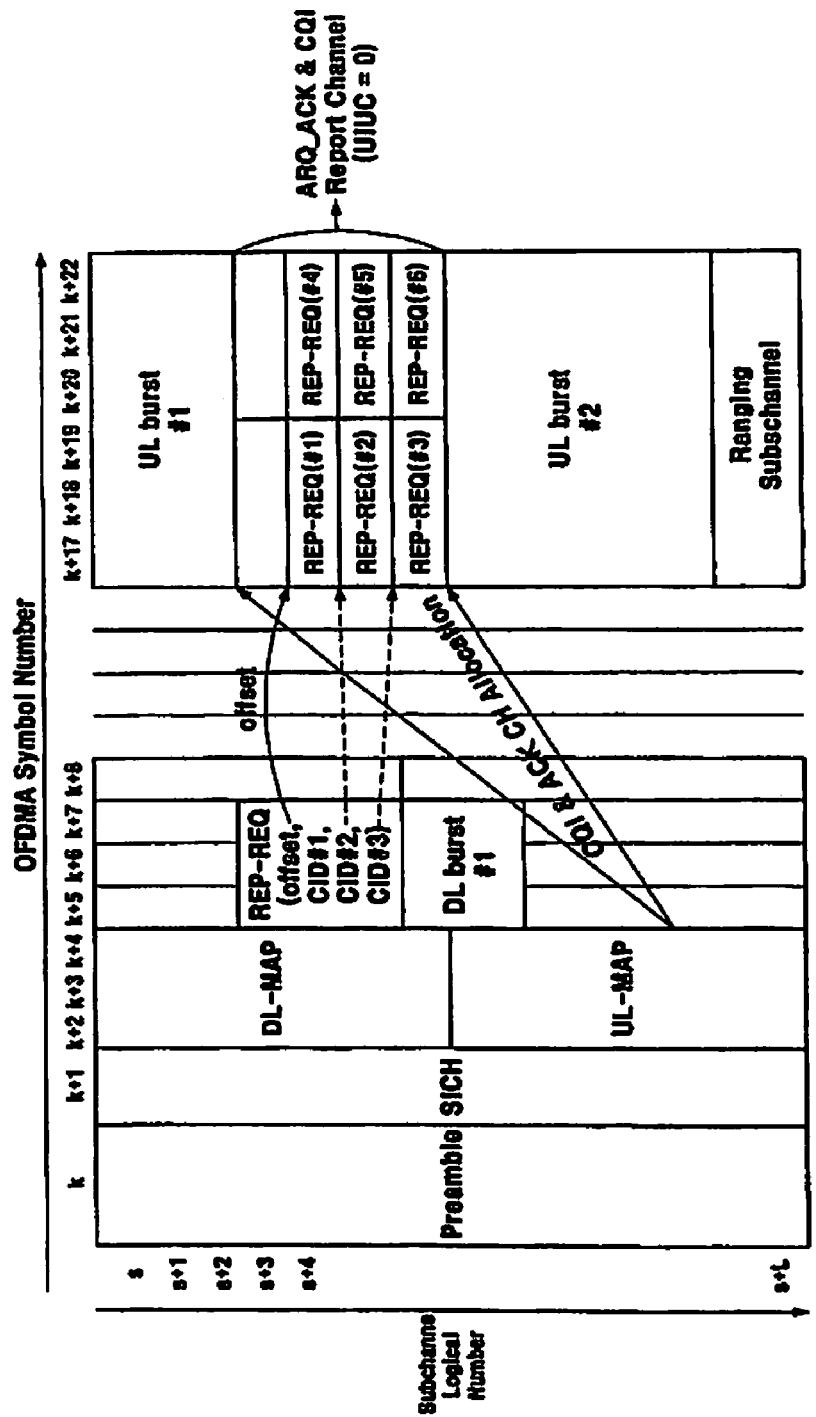
FIG. 13 shows uplink and downlink resource allocation structures shown in FIG. 5.

FIG. 13 shows uplink and down link resource allocation structures shown in FIG. 5.

In the OFDMA system, a radio resource frame can be realized as a two-dimensional structure including the sub channel in the frequency domain and the symbol in the time domain.

The downlink frame includes UL-MAP information. The UL-MAP includes the channel allocation information for the CQI and the ARQ_ACK message. The burst of the downlink frame may include a REP-REQ.

A REP-RSP is transmitted in response to the REP-REQ message by using the burst of the uplink frame corresponding to the channel allocation information.

The measured channel quality information may be reported to the CQI dedicated channel in a Compressed-REP-RSP message or a CQI Codeword format.

As stated, when the corresponding subscriber station quickly receives and transmits the data corresponding to the variance of the channel environment in a mobile communication system, the most adaptive modulation and channel coding level is applied to increase the transmission amount of the downlink, thereby enhancing the performance.

Although embodiments of the present invention have been described in detail hereinabove in connection with certain exemplary embodiments, it should be understood that the invention is not limited to the disclosed exemplary embodiment, but, on the contrary is intended to cover various modifications and/or equivalent arrangements included within the spirit and scope of the present invention, as defined in the appended claims.

With the structure of the present invention, the subscriber station allocates the resources in advance, which can transmit the channel quality information result upon transmitting the CQI request message so that the delay time (that it takes for the subscriber station to report the channel measurement result) is reduced as much as possible thereby quickly processing the that changes of the channel environment.

Also, with the structure of the present invention, when the uplink data or the downlink data is provided, the channel quality information can be reported efficiently by using an ARQ_ACK message or uplink data PDU, and the overhead of the uplink resource is minimized.

Also, the frequency and period of the channel quality report may be determined by using the channel quality information values so that the downlink adaptive modulation, coding level, and radio resource allocation may be performed efficiently.

The invention claimed is:

1. A method for requesting Channel Quality Information (CQI) by a base station of a wireless communication system, the method comprising:
   determining timing of a CQI request based on information from a subscriber station;
   requesting an Automatic Repeat reQuest ACKnowledgement (ARQ-ACK) message of downlink data and the CQI from the subscriber station at the determined timing;
   allocating a radio resource for a report of the CQI to the subscriber station;
   allocating a radio resource for the ARQ-ACK message to the subscriber station;
   receiving the ARQ-ACK message and the CQI from the subscriber station; and
   determining a modulation and coding level of downlink data based on the CQI.

2. The method of claim 1, wherein the radio resource for the report of the CQI and the radio resource for the ARQ-ACK message are allocated by using a same channel.

3. The method of claim 1, wherein the information from the subscriber station includes informaion on a Carrier to Interference Noise Ratio (CINR) of a downlink that is previously received from the subscriber station.

4. The method of claim 3, wherein the informaion on the CINR includes a mean value or standard deviation of the CINR.

5. A method for reporting Channel Quality Information (CQI) by a subscriber station of a wireless communication system, the method comprising:
   receiving a request of an Automatic Repeat reQuest ACKnowledgement (ARQ-ACK) message of downlink data and a request of the CQI from a base station, at timing determined by the base station;
   receiving allocation of a radio resource for a report of the CQI from the base station;
   receiving allocation of a radio resource for the ARQ-ACK message from the base station; and
   transmitting the ARQ-ACK message and the CQI to the base station.

6. The method of claim 5, wherein the radio resource for the report of the CQI and the radio resource for the ARQ-ACK message are allocated by using a same channel.

7. The method of claim 5, wehrein the timing is determined based on information that is previously provided by the subscriber staiton.

8. The method of claim 7, wherein the information that is previously provided by the subscriber staiton includes informaion on a Carrier to Interference Noise Ratio (CINR) of a downlink that is previously provided by the subscriber station.

9. The method of claim 8, wherein the informaion on the CINR includes a mean value or standard deviation of the CINR.

10. An apparatus for requesting Channel Quality Information (CQI), the apparatus comprising:
- a MAC layer configured to determine timing of a CQI request based on information from a subscriber station, allocate a radio resource for a report of the CQI to the subscriber station, allocate a radio resource for an Automatic Repeat reQuest ACKnowledgement (ARQ-ACK) message to the subscriber station, and determine a modulation and coding level of downlink data based on the CQI received from the subscriber station; and
- a PHY layer configured to request the ARQ-ACK message of downlink data and the CQI from the subscriber station at the determined timing, and receive the ARQ-ACK message and the CQI from the subscriber station.

11. The apparatus of claim 10, wherein the radio resource for the report of the CQI and the radio resource for the ARQ-ACK message are allocated by using a same channel.

12. The apparatus of claim 10, wherein the information from the subscriber station includes informaion on a Carrier to Interference Noise Ratio (CINR) of a downlink that is previously received from the subscriber station.

13. The apparatus of claim 12, wherein the informaion on the CINR includes a mean value or standard deviation of the CINR.

* * * * *